United States Patent
Jackson et al.

[11] Patent Number: 6,107,770
[45] Date of Patent: Aug. 22, 2000

[54] CONTROL SYSTEM FOR COUNTER-OSCILLATING MASSES

[75] Inventors: Richard S. Jackson, Lakewood, Colo.; Girard M. Manke, Huntington Beach, Calif.

[73] Assignees: Lockheed Martin Corporation, Bethesda, Md.; The Aerospace Corporation, El Segundo, Calif.

[21] Appl. No.: 09/236,889

[22] Filed: Jan. 26, 1999

Related U.S. Application Data

[60] Provisional application No. 60/072,693, Jan. 27, 1998.

[51] Int. Cl.$^7$ ............................... G05B 5/01; H02K 7/02; G02B 26/08; B64G 1/28; F16H 27/02

[52] U.S. Cl. ........................ 318/611; 318/616; 318/623; 318/648; 318/649; 318/37; 318/58; 318/161; 700/60; 359/199; 359/213; 244/165; 310/36; 310/74

[58] Field of Search ..................................... 318/560, 569, 318/600, 601, 611, 615, 616, 617, 623, 625, 629, 630, 648, 649, 651, 37, 54, 55, 58, 59, 61, 64, 65, 66, 67, 68, 77, 90, 119, 161, 255–257, 260, 263, 268, 269, 271, 276; 700/56–64; 359/196–199, 212–214; 356/5.01–5.08; 244/158 R, 164, 165, 170; 310/36, 37, 80, 74; 74/5 R–5.47, 5.7, 25, 86, 89, 89.1

[56] References Cited

U.S. PATENT DOCUMENTS

| | | | |
|---|---|---|---|
| 3,952,217 | 4/1976 | Rawlings | 310/36 |
| 4,021,716 | 5/1977 | Rue | 244/165 X |
| 4,375,878 | 3/1983 | Harvey et al. | 244/265 X |
| 4,723,735 | 2/1988 | Eisenhaure et al. | 244/165 |
| 5,012,170 | 4/1991 | Atlas | 318/611 |
| 5,042,753 | 8/1991 | Atlas | 244/165 |
| 5,063,336 | 11/1991 | Atlas | 318/611 |
| 5,131,611 | 7/1992 | Vollaro | 244/158 R |
| 5,210,636 | 5/1993 | Baer | 359/200 |
| 5,256,942 | 10/1993 | Wood | 318/649 |
| 5,283,682 | 2/1994 | Ostaszewski | 359/198 |
| 5,396,815 | 3/1995 | Polites et al. | 74/61 |
| 5,504,407 | 4/1996 | Wakui et al. | 318/568.17 |
| 5,552,893 | 9/1996 | Akasu | 356/5.01 |
| 5,611,505 | 3/1997 | Smay | 244/165 |
| 5,708,332 | 1/1998 | Bottger et al. | 318/45 |
| 5,751,078 | 5/1998 | Loewenthal | 310/36 |
| 5,790,241 | 8/1998 | Trussell, Jr. | 356/4.01 |
| 5,816,538 | 10/1998 | Challoner et al. | 244/170 |
| 5,921,505 | 7/1999 | Spector | 244/165 |
| 5,925,957 | 7/1999 | Chapman | 310/90.5 |
| 6,020,956 | 2/2000 | Herman et al. | 356/139.01 |

*Primary Examiner*—Brian Sircus
*Attorney, Agent, or Firm*—Dorr, Carson, Sloan & Birney, P.C.

[57] ABSTRACT

A control system stabilizes the flexible body bending modes of a space, airborne, or ground-based system, while providing angular position control of an oscillating mass connected to a counter-oscillating counterbalance. The actuating mechanism uses two drive motors to exert torques on the mass and counterbalance, respectively, under the control of a feedback controller. The controller has a first control channel generating a first torque command signal for the first drive based on the angular position of the mass, and a second control channel generating a second torque command signal for the second drive based on the angular position of the counterbalance and a torque cross-feed signal from the first control channel. The second control channel includes a notch filter for removing input frequencies in a predetermined bandwidth about the frequency of the first torque command signal. The same controller can be used to control the system in oscillation and for large angle repositioning of the mass and counterbalance. The present invention provides a control system for a highly precise and efficient mechanical scanning device suitable for use in a space-based LIDAR system or other similar systems.

20 Claims, 8 Drawing Sheets

*Fig. 5 (a)* High Bandwidth Counterbalance

*Fig. 5 (b)* Open-Loop Counterbalance Controller

CONTROL SYSTEM FOR COUNTER-OSCILLATING MASSES

RELATED APPLICATION

The present application is based on the Applicants' U.S. Provisional Patent Application Ser. No. 60/072,693, entitled "Control System for Oscillating Structures," filed on Jan. 27, 1998.

GOVERNMENT RIGHTS

This invention was made with Government support under Contract No. F33657-98-C-3008. The Government has certain rights in this invention.

BACKGROUND OF THE INVENTION

1. Field of the Invention

The present invention relates generally to the field of control systems. More specifically, the present invention discloses a control system for counter-oscillating masses, such as found in a light detection and ranging (LIDAR) spacecraft, to provide overall controller and system structural modal stability.

2. Statement of the Problem

Spacecraft have been used for a number of years for remote sensing of earth environmental concerns. Some of these spacecraft have employed small oscillating mirrors to optically scan earth features. An application of this type, using a large mirror, has been proposed for a LIDAR payload. A large oscillating inertia on a spacecraft, even when a counterbalance is used, can couple through the scanning controller with flexible spacecraft structure to cause structural modal instability of the overall system. The requirement to stabilize the overall spacecraft structural system including the controller is the primary motivation behind this invention.

Active remote sensing techniques using lasers such as LIDAR and laser altimetry, have proven useful for many years. While such methods from ground-based and airborne platforms are fairly mature, active remote sensing from space-based platforms is still very much in its infancy. However, the global reach of space-based methods make them highly attractive for a wide range of active remote sensing activities such as detection of atmospheric pollution, global wind measurement, topological, chlorophyll and mineral mapping, and global climate monitoring. An important requirement for space-based LIDAR-type systems is the ability to accurately scan a laser spot and collect the scattered return signal. In general, this translates to the ability to precisely scan a large aperture mirror system. Throughout the remainder of the present application, the word "system" should be construed as including, but not being limited to a LIDAR or similar space-based system.

Figure 1:
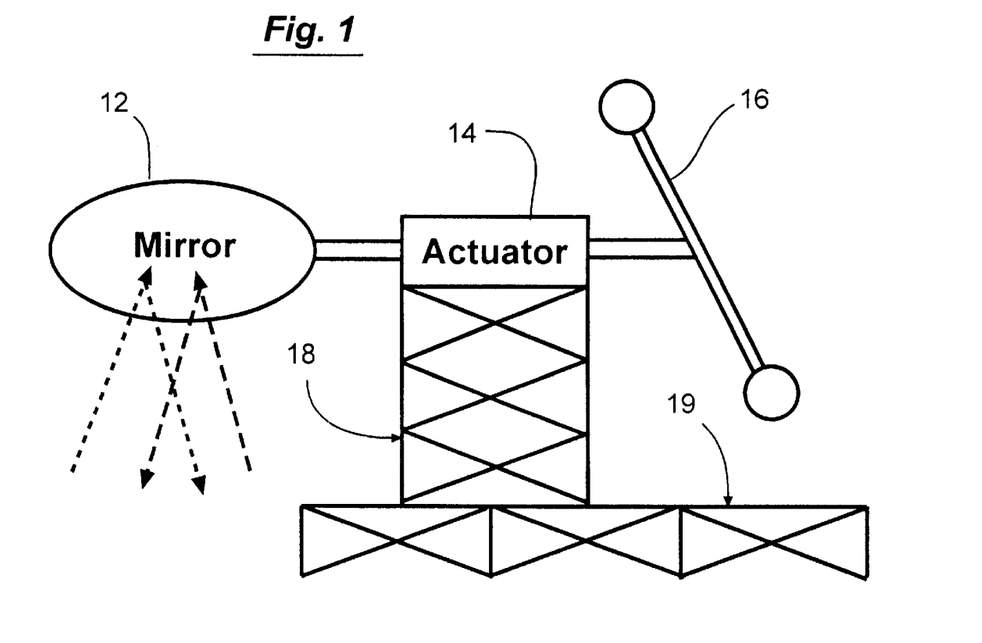
FIG. 1 is a schematic diagram of a LIDAR scanning device with a mirror 12 and counterbalance 16.

FIG. 1 is a simplified schematic diagram of the scanning device, including a mirror 12, a counterbalance 16, and an actuator 14 for rotating the mirror 12 and counterbalance 16 about a common axis. The mirror 12 oscillates in a sinusoidal scanning motion with an amplitude of plus and minus a certain number of desired degrees. The oscillation is about a center position which could be nadir or any other commanded center position. The counterbalance 16 is driven oppositely to the mirror 12 to produce, in the ideal case, zero net angular momentum. A closed-loop controller commands and stabilizes the oscillating motion of the mirror 12 and counterbalance 16.

Research into controller designs uncovered an unexpected result in which the actuator 14, closed-loop controller, and flexible spacecraft structure 18 couple to create an unstable condition. The instability was unexpected because the actuator is designed, with the mirror 12 and counterbalance 16 oscillating in opposite directions, to produce very little net force and torque on the mounting structure. The actuator 14 is attached to a flexible mounting structure 18 that is in turn attached to a spacecraft bus 19 that hosts the system payload. Other possible flexible elements of this system are the bus 19 itself and appendages such as solar arrays and booms supporting antenna and other instrument packages. All such flexible elements can contribute to the observed instability. Straight forward application of a conventional PID (proportional, integral, differential) controller was found not to be sufficient to stabilize this phenomenon. Therefore, a need exists for a control system capable of preventing such instability in this type of system.

3. Solution to the Problem

The present invention provides a control system for a highly precise and efficient mechanical scanning device suitable for use in this type of system. In particular, the present invention employs feedback control with a high bandwidth channel for the mirror and a low-bandwidth channel for the counterbalance. The counterbalance control channel includes torque cross-feed from the mirror control channel, and a notch filter to remove the commanded oscillation frequency.

SUMMARY OF THE INVENTION

This invention provides a new controller design that is capable of stabilizing the flexible body bending modes of the system containing the controller and its actuating mechanism, while providing angular position control of an oscillating mass connected to a counter-oscillating counterbalance. The actuating mechanism uses two drive motors to exert torques on the mass and counterbalance, respectively, under the control of a feedback controller. The controller has a first control channel generating a first torque command signal for the first drive based on the angular position of the mass, and a second control channel generating a second torque command signal for the second drive based on the angular position of the counterbalance and a torque cross-feed signal from the first control channel. The second control channel includes a notch filter for removing input frequencies in a predetermined bandwidth about the frequency of the first torque command signal. Removal of frequencies at and about the first torque command signal allows just enough of the counterbalance controller error signal through the counterbalance channel to keep the oscillation of the counterbalance centered about its desired center of oscillation, and it allows essentially equal and opposite torques to be commanded to the mass and counterbalance. These features contribute significantly to the capability of this new design to stabilize the system flexible body structural modes. The present invention provides a control system for a highly precise and efficient mechanical scanning device suitable for use in a space-based LIDAR application or other similar airborne or ground-based systems. These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 2(a) and 2(b) are schematic diagrams of two examples of prior art actuators. FIG. 2(a) uses a reaction wheel to cancel the torque and momentum imparted to a vehicle or mounting structure by a rotating mirror in a LIDAR system or by any rotating mass in a similar system. FIG. 2(b) uses a counter-rotating mass for this purpose. However, neither example is known to employ the unique controller described in this invention.

DETAILED DESCRIPTION OF THE INVENTION

Actuator Selection

The actuators described herein, by themselves, are not the heart of this invention. However, the description of the candidate actuators helps define the environment of intended use for the present control system.

Figure 2A:
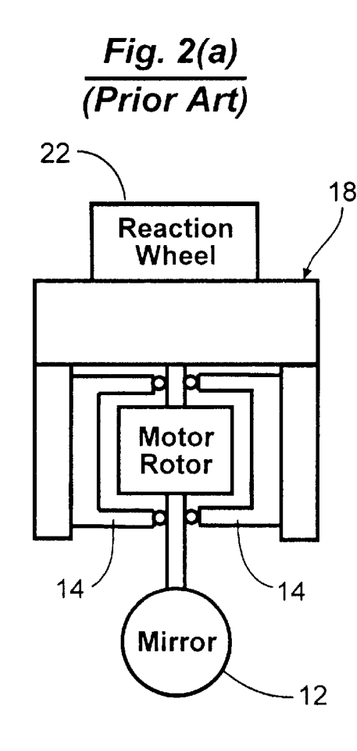
Figure 2B:
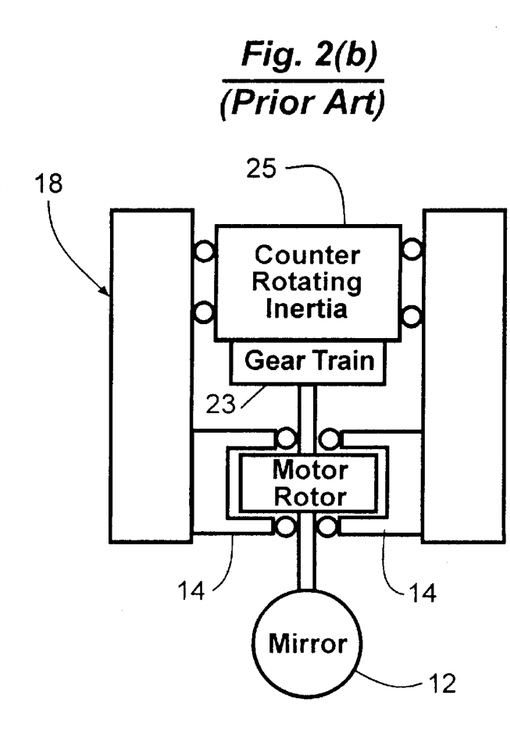
Figure 3:
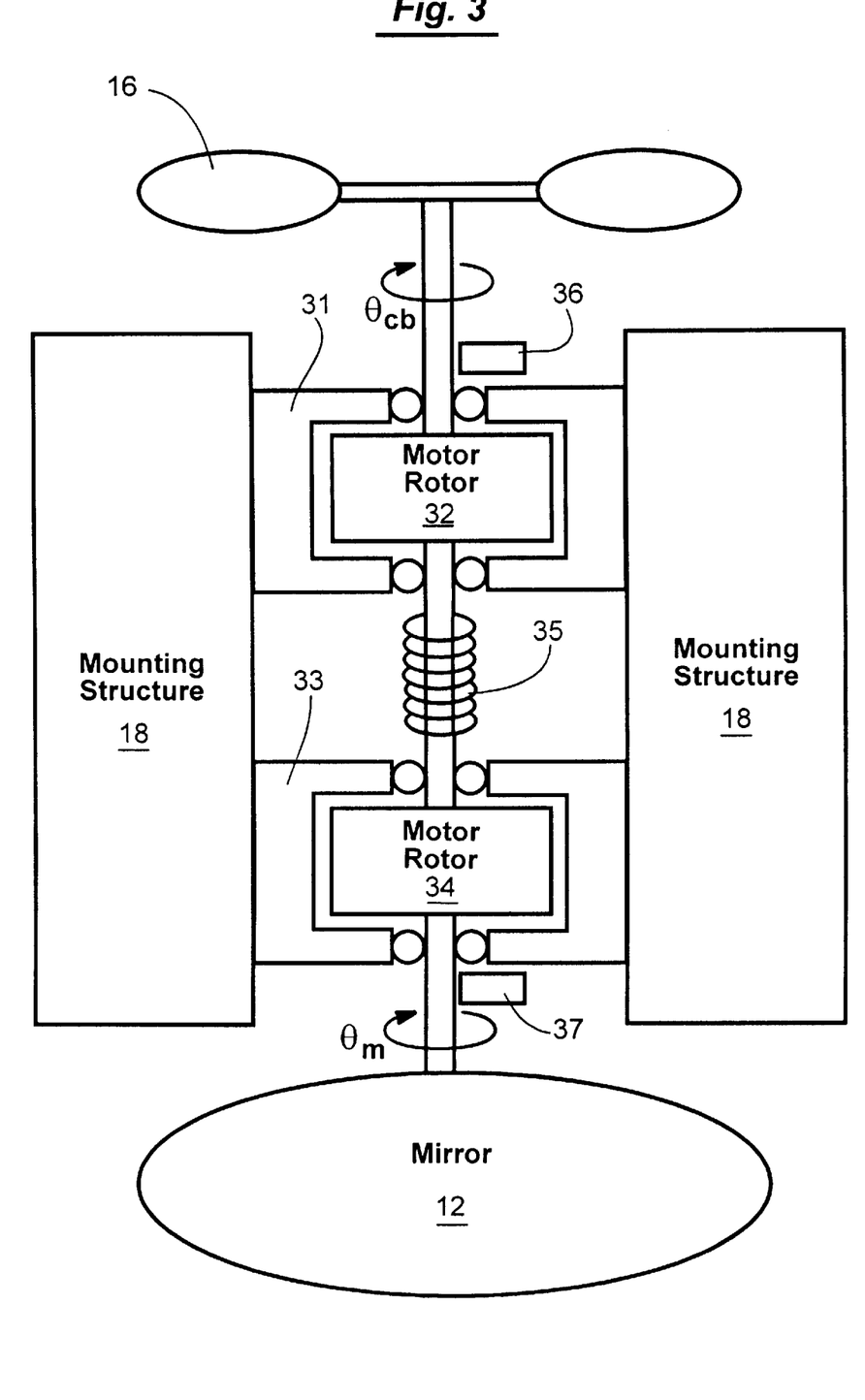
FIG. 3 is a schematic diagram of a LIDAR non-reactive drive system using a first drive for the mirror and a second drive for the counterbalance.

One of the concerns with a large oscillating mirror 12 is the disturbances it imparts to the spacecraft bus 19, as shown in FIG. 1. For a one-meter mirror, a significant disturbance torque would arise beyond the capability of standard reaction wheel systems. The oscillating mirror 12 will impart a disturbance to the spacecraft unless some type of cancellation technique is used. FIGS. 2(a), 2(b), and 3 show three candidate schemes to incorporate a reactionless drive.

As shown in FIGS. 2(a) and 2(b), traditional approaches use a reaction wheel or a counter-rotating inertia to cancel the torque and momentum imparted to the vehicle. The counter-rotating inertia is not powered by a separate motor as in FIG. 3. These approaches have significant shortcomings in that they require additional power and would be hard pressed to meet the torque required to cancel the effect of a large oscillating mirror. In the drive shown in FIG. 2(a), a specially designed high-torque wheel 22 would be required. The second traditional option shown in FIG. 2(b) uses a counter-rotating inertia 25 driven a gear train 23. This technique will supply the required torque but is highly inefficient in terms of power.

The reactionless drive shown in FIG. 3, which is the actuator used in the preferred embodiment of this invention, uses a torsion spring 35 to connect the mirror 12 to a counterbalance mass 16. The ends of the torsion spring 35 are attached only to the mirror 12 and counterbalance 16. The spring 35 allows potential energy to swap back and forth between the mirror 12 and counterbalance 16 thus minimizing the torque capability required of the drive motors 31, 32 and 33, 34. This configuration results in basically a second-order resonant spring-mass system. Minimum power consumption is achieved when the oscillatory scanning motion is driven at the resonant frequency of the system. As a variation, two torsion springs could be used, one for the mirror and one for the counterbalance, where one end of each spring is rigidly attached to a non-rotating structure such as the case of the drive motors. However, this variation would preclude large-angle repositioning of the mirror. It should also be understood that the torsion spring 35 need not be a separate element, but rather could result from the torsional spring constant of the shaft connecting the mirror 12 and counterbalance 16. In contrast to the embodiments shown in FIGS. 2(a) and 2(b), this approach is not only reactionless but also energy efficient.

Two DC torque motors 31, 32 and 33, 34 are shown in FIG. 3, one on each mass 12, 16. It may seem possible that only one motor would be sufficient to excite a resonant system; however, the characteristics of this particular system might preclude the use of just one motor. In this system the inertias of the mirror 12 and counterbalance 16 are large, and this system is very lightly damped because it is built with extremely low friction to minimize power consumption. With only one motor, an excessively long time of uneven oscillatory motion is observed before accurate steady-state scanning is achieved. In the oscillatory or scanning mode, the two motors drive the mirror 12 and counterbalance 16 in opposite directions. As a result, steady-state oscillatory motion is quickly achieved. In the repositioning mode, the mirror 12 can be positioned to scan about any center position. Repositioning requires that the mirror and counterbalance motor be slewed in the same direction. Again, two drives are best for repositioning large inertias in a lightly damped system. The actuator used in the preferred embodiment of this invention implies a dual-channel controller.

Two highly-precise absolute encoders 36 and 37, one on the counterbalance motor shaft and one on the mirror motor shaft, furnish the positions of the shafts to the closed-loop controller and may be used to commutate the motors.

This actuator design meets all requirements for this scanning application and it seems fairly straightforward. However, as mentioned in the Statement of the Problem, when this system is mounted on a flexible spacecraft, unexpected coupling occurs with the spacecraft structure that gives rise to system instability. The controller designs that are needed to stabilize this system are discussed next.

Controller Design

This section develops the system plant model and then discusses several candidate control schemes for stabilizing the plant while meeting high positioning accuracy requirements and minimizing disturbances on the spacecraft.

System Plant Model

Figure 4:
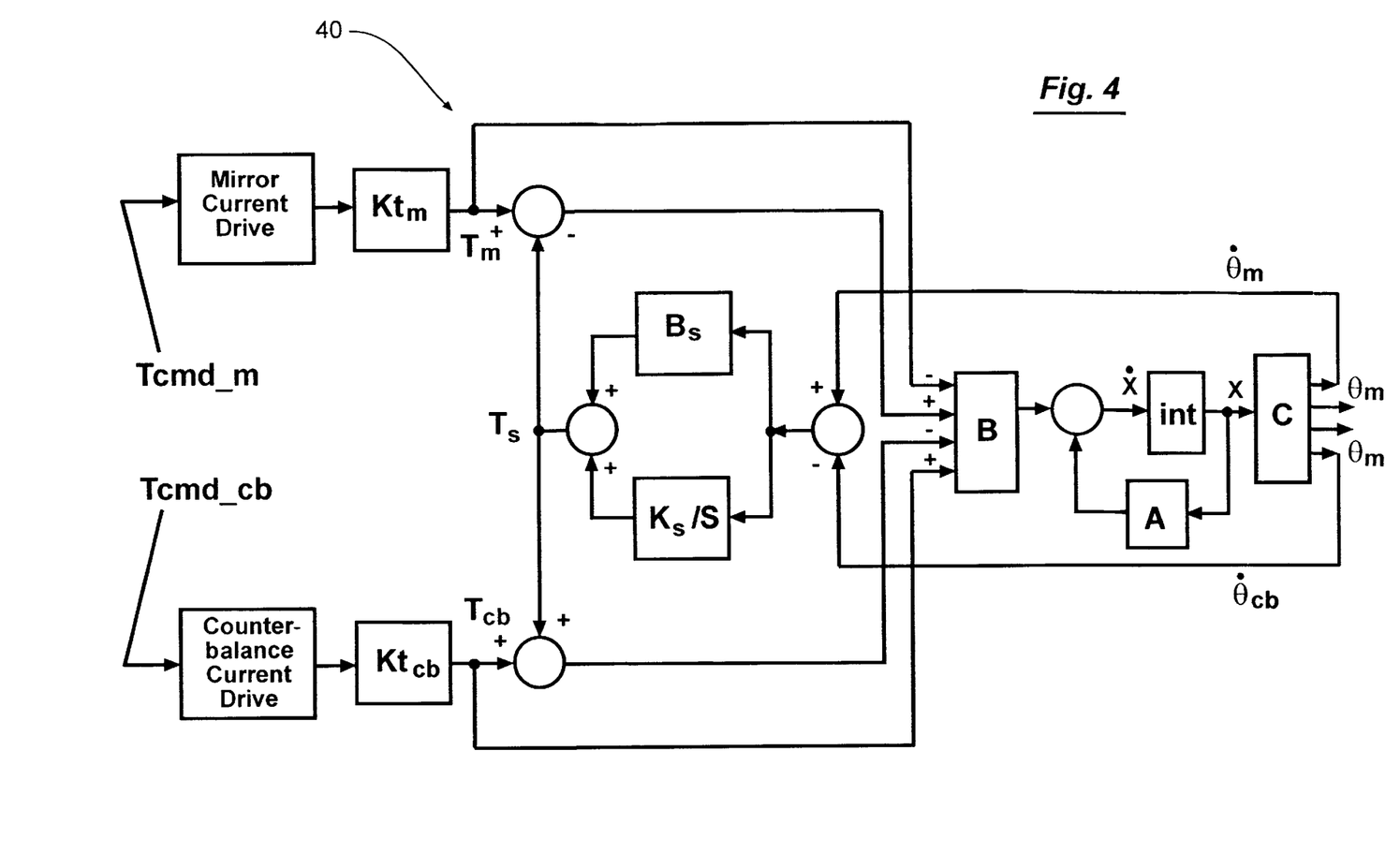
FIG. 4 is a block diagram of the LIDAR flexible body plant model.

FIG. 4 is a block diagram of the flexible body spacecraft plant model. The controller generates the torque commands $T_{cmd\_m}$ and $T_{cmd\_cb}$ to the mirror and counterbalance drive motors. In FIG. 4, $Kt_m$ and $Kt_{cb}$ are the torque constants for the mirror and counterbalance motors. $T_m$ and $T_{cb}$ are the torques generated by the motors. $T_s$ is the spring torque acting on the mirror and counterbalance. $B_s$ is the damping constant of the spring and $K_s$ is the spring constant.

In the flexible body state space plant model, B is the system input matrix, C is the output matrix, and A is the system or plant matrix. The A matrix contains bending modes and the mirror and counterbalance inertia effects. The outputs of the C matrix contain the effects of the bending modes.

The input to the B matrix has four elements. For the mirror, the torque from the mirror motor plus the spring torque is applied to the mirror inertia. The motor torque, $T_m$, is applied with a negative sign to the motor case and thus is the reaction torque resulting from motor action that is felt by the mounting structure. Torques are applied similarly in the counterbalance control channel.

Figure 7:
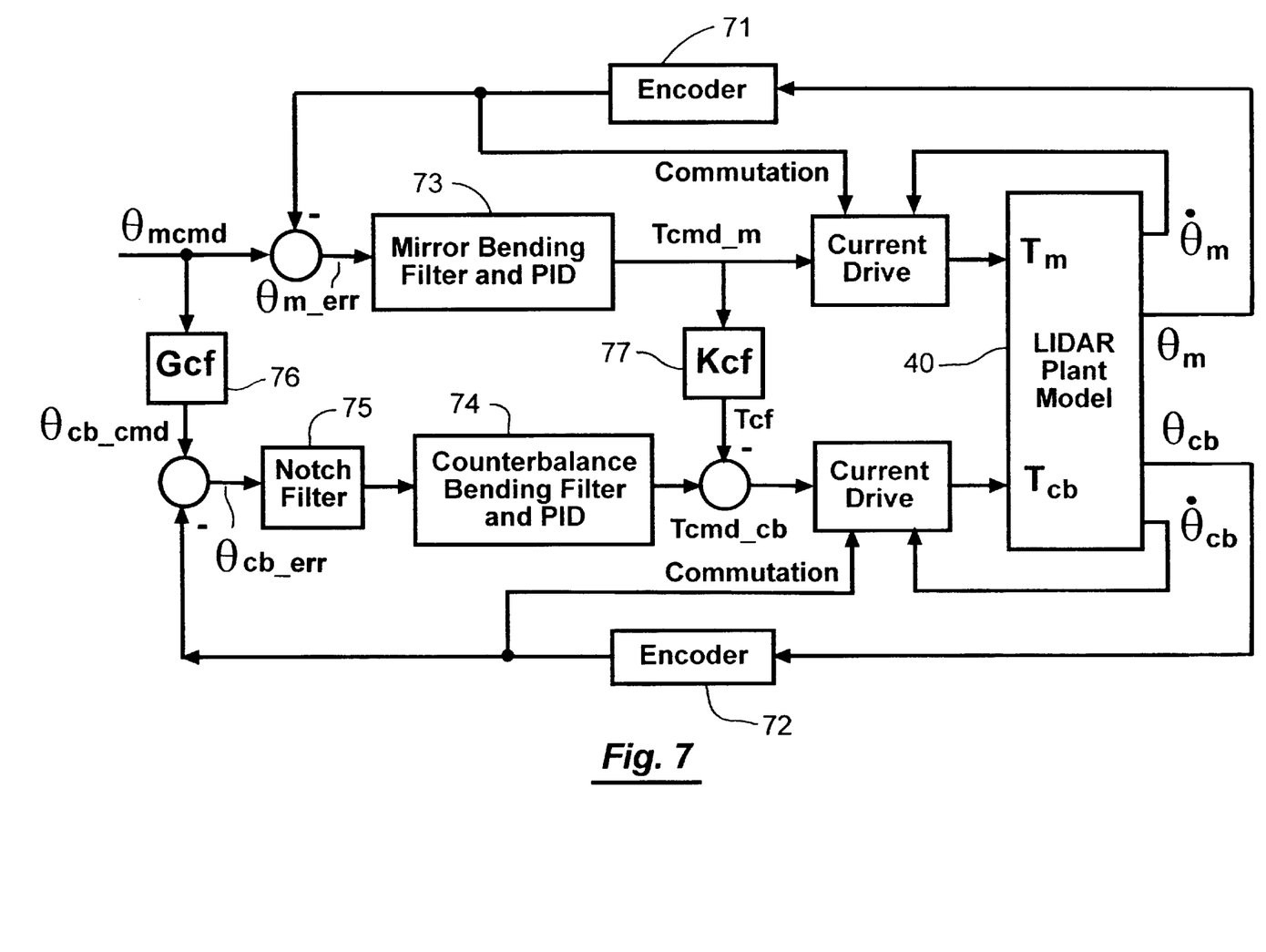
FIG. 7 is a block diagram of a controller similar to FIG. 5(c), but including a notch filter in the counterbalance control channel.

Referring ahead to FIG. 7, one example is shown of how the LIDAR plant model 40 (from FIG. 4) is integrated into an overall closed-loop controller scheme. In FIG. 7, two control channels are shown, one for the mirror channel containing a PID controller and a bending filter 73, and one for the counterbalance channel also containing a PID controller and a bending filter 74. These bending filters remove input frequencies corresponding to the bending modes of the mirror 12 and counterbalance 16, respectively. Thus, the bending filters serve to stabilize the local bending modes of the mirror and counterbalance, and they may or may not contribute to stabilizing the system stability problem which involves flexibility of the entire spacecraft or mounting structure.

A PID controller allows any combination of proportional, integral, and differential functions to be generated by the input to generate the controller output. However, proportional-differential controllers may be sufficient in the present invention.

Of note in FIG. 7 is the $\theta_{mcmd}$ variable. It is the sinusoidal position command for the mirror. The gain factor ($G_{cf}$) 76 is nominally −1. It inverts $\theta_{mcmd}$ to drive the counterbalance oppositely to the mirror. $G_{cf}$ is always negative for the oscillatory mode. It is equal to the inertia ratio of the mirror to the counterbalance, and thus may be somewhat greater than or less than exactly −1. In the reposition mode, where the mirror and counterbalance move together in the same direction, $G_{cf}$ is set to +1. FIG. 7 also shows a notch filter 75 and a torque cross feed gain ($K_{cf}$) 77. These items are unique and crucial to solution of the system stability problem and are discussed in the next section.

Candidate Controller Designs

Figure 5:
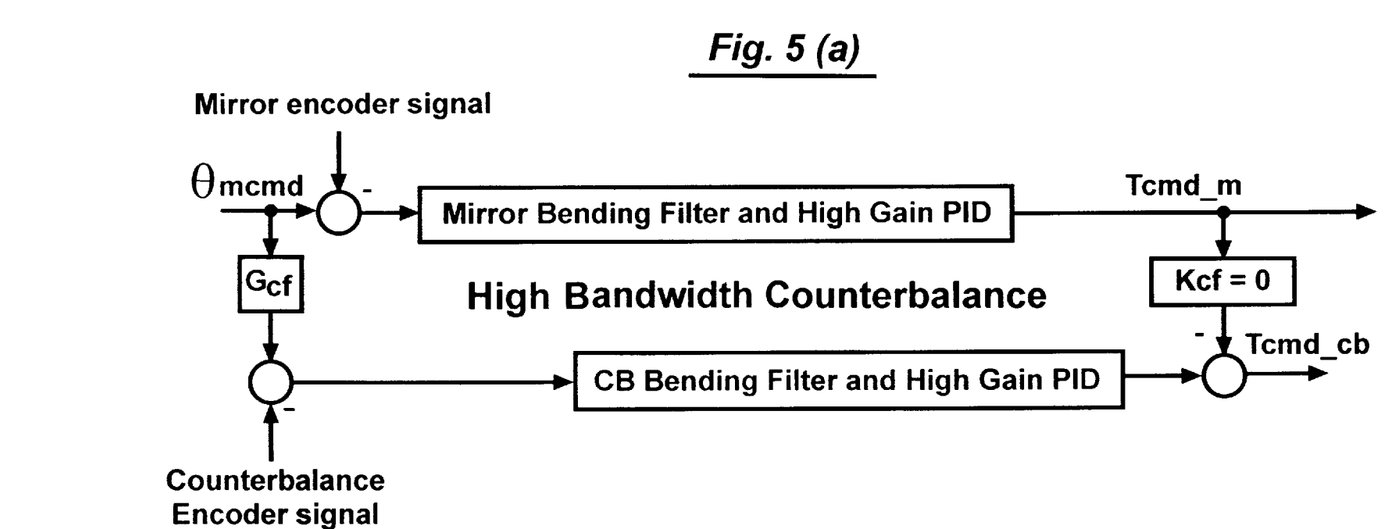
FIG. 5(a) is a block diagram of a controller using matched high-gain mirror and counterbalance control channels.
FIG. 5(b) is a block diagram of a controller using an open-loop counterbalance control channel. In contrast to FIG. 5(a), the counterbalance channel is entirely absent in this figure.
FIG. 5(c) is a block diagram of a controller using torque cross-feed with a low-bandwidth counterbalance channel.

FIGS. 5(a) through 5(c) show three candidate controller designs. The bandwidth and thus the gain of the mirror channel always has to be high to meet the precision pointing requirements for the mirror. Each design is discussed in the following subsections:

Matched High-Gain Mirror and Counterbalance Control Channels

Figure 6:
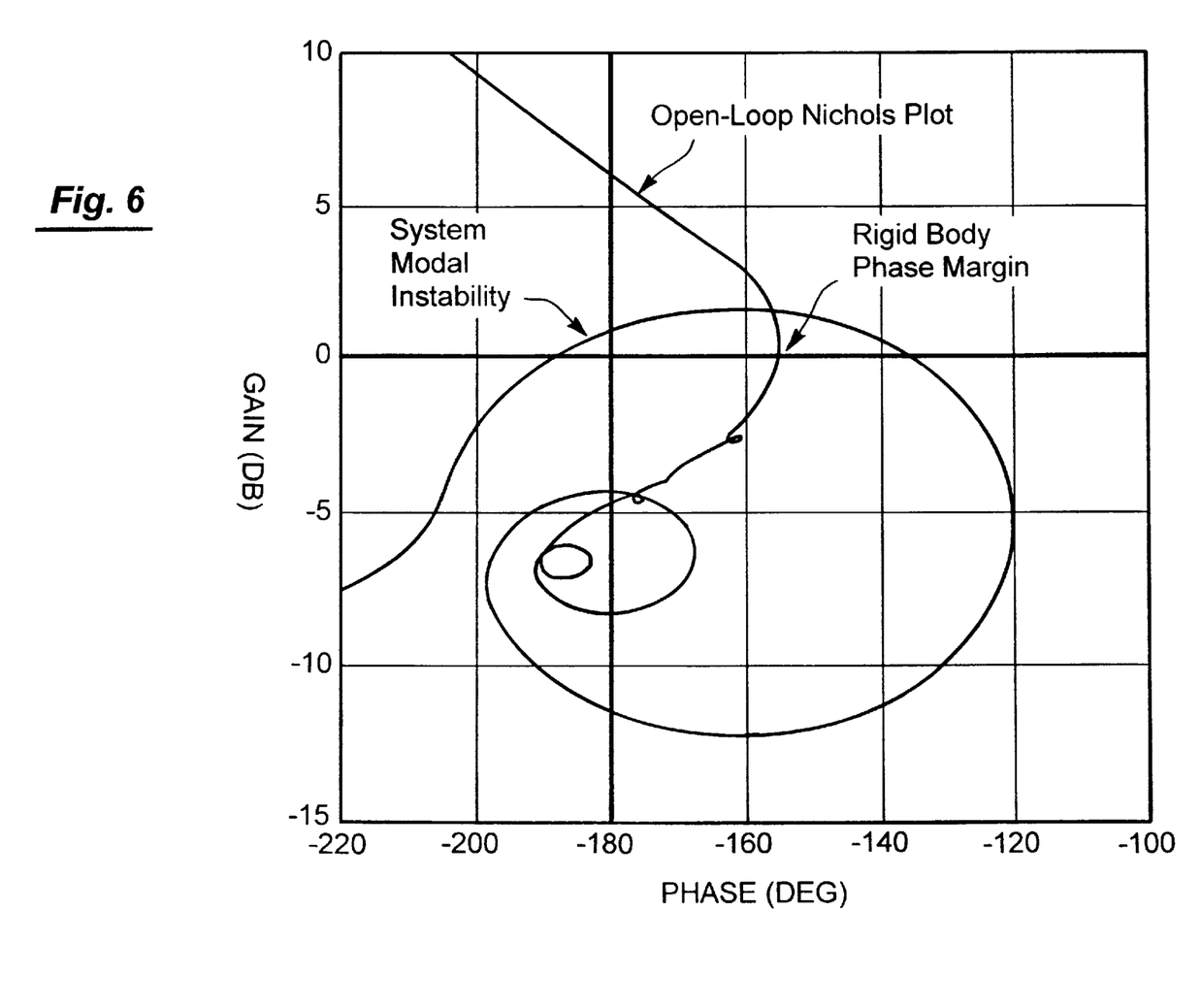
FIG. 6 is a Nichols plot of the system with the controller shown in FIG. 5(a).

The first attempt at a controller design, shown in FIG. 5(a), has equal high-bandwidth channels for both the mirror and counterbalance. This configuration easily meets positioning requirements for the mirror but results in an unstable system as shown in the Nichols plot of FIG. 6. Instability in FIG. 6 is indicated by the curve passing above the −180 degree, 0 dB point on the plot. This instability is caused, as mentioned previously, by coupling between the controller, the drive actuator, and spacecraft flexible elements.

To resolve this system instability, the key observation is that if equal but opposite torque is applied to the mirror and counterbalance, then there should be no net reaction torque applied back on the flexible spacecraft. With dual high-gain position channels this is impossible to do in a practical sense because of parameter variations. One specific problem is the need to exactly calibrate the command cross feed gain, $G_{cf}$, which as mentioned earlier, is the ratio of the mirror to counterbalance inertia. The effective inertias of the mirror and counterbalance depend on their bending characteristics and are therefore difficult to predict precisely. A straightforward solution is to feed the commanded torque, $T_{cmd\_m}$, with a negative sign, to the counterbalance and open the counterbalance control loop. Thus we have equal and opposite torques applied to the mirror and counterbalance. This configuration is shown in FIG. 5(b).

Open-Loop Counterbalance Controller

The open-loop counterbalance controller in FIG. 5(b) appears to be an ideal solution to the control problem as it eliminates the need to cross feed the commanded mirror angle so that the inertia ratio need not be known accurately, and it eliminates the possibility of the counterbalance exciting system flexible body modes. Unfortunately, it has the downfall of all open-loop schemes in that it is very sensitive to parameter differences in the plant. In fact, this configuration is unstable. The counterbalance will slowly drift away from its center point due to plant differences between the mirror and the counterbalance. Obviously, a closed-loop control channel for the counterbalance is still needed.

Torque Cross Feed with Low Bandwidth Counterbalance Channel

The low bandwidth counterbalance controller, shown in FIG. 5(c), removes many of the sensitivity problems. However the bandwidth of the controller must be kept high enough to at least keep the counterbalance centered about its center of oscillation and to remain insensitive to variations in the motor torque constants, $K_{tm}$ and $K_{tcb}$, as shown in FIG. 4. This creates two problems: First, since the command frequency of $\theta_{mcmd}$ is coming through the counterbalance PID controller, too much torque, $T_{cmd\_cb}$, is commanded. In fact $T_{cmd\_cb}$ can be almost double since it is the sum of the torque cross feed through $K_{cf}$ and the torque command from the counterbalance PID controller. The only way to avoid $T_{cb}$ becoming excessively large is to lower the gain of the counterbalance PID controller further to the point where the counterbalance channel is almost open loop. Thus we are back to the problems of the open-loop controller. Secondly, the position command $\theta_{mcmd}$ must still be cross-fed to the counterbalance, so the inertia ratio must be known. Further, this approach only very slightly reduces the susceptibility to system modal instability. The ideal controller would not excite system modes, would be insensitive to plant variations, and would not require knowledge of the inertia ratio. The following controller meets these requirements.

Torque Cross Feed with Command Signal Notch Filter

By adding a notch filter as shown in FIG. 7, set at the frequency of $\theta_{mcmd}$, to the low bandwidth counterbalance control loop, the torque commanded at the command frequency is removed. (Recall that the frequency of $\theta_{mcmd}$ is constant, equal to the resonant frequency of the spring-mass actuator system.) This solves the excessive torque problem and other problems mentioned above with the low bandwidth counterbalance channel. Because the notch filter is designed to remove the command frequency, the closed-loop counterbalance loop can focus on centering the counterbalance while allowing the torque cross feed through $K_{cf}$ to take care of the torque cancellation. The parameter, $K_{cf}$, is also used to compensate for any differences in torque constants, $K_{tm}$ and $K_{tcb}$, between the mirror and counterbalance motors, and therefore in practice may not be exactly 1.0. Because the command signal frequency is removed, the notch filter makes the counterbalance controller insensitive to the inertia ratio. With the notch filter included, the counterbalance bandwidth may not exceed the command frequency. Inclusion of the notch filter in this system is a large part of what makes this invention a significant improvement over the prior art.

Returning to FIG. 7, a schematic diagram is provided of the controller. The mirror encoder 71 outputs the angular position of the mirror, $\theta_m$, and the counterbalance encoder 72 outputs the angular position of the counterbalance, $\theta_{cb}$. The controller receives a command signal for the desired angular position of the mirror, $\theta_{mcmd}$, as an input. In the mirror control channel, $\theta_m$ is subtracted from $\theta_{mcmd}$ to output $\theta_{m\_err}$ to the mirror bending filter and PID 73. The PID generates a mirror torque command signal, $T_{cmd\_cb}$, as a proportional, integral, and differential function of $\theta_{m\_err}$.

In the counterbalance control channel, $\theta_{mcmd}$ is multiplied by a predetermined cross-feed gain factor, $G_{cf}$, to output $\theta_{cb\_cmd}$. $\theta$ is then subtracted from $\theta_{cb\_cmd}$ to output $\theta_{cb\_err}$ to a notch filter 75, which removes or attenuates frequencies from $\theta_{cb\_err}$ in a predetermined bandwidth about the frequency of the command signal, $\theta_{mcmd}$. The filtered $\theta_{cb\_err}$ is processed by the counterbalance bending filter and PID 74, which generates a counterbalance torque command signal, $T_{cmd\_cb}$, as a proportional, integral, and differential function of the filtered $\theta_{cb\_err}$.

The mirror torque command signal, $T_{cmd\_m}$, for the mirror control channel is multiplied by a predetermined torque cross-feed factor, $K_{cf}$, to output $T_{cf}$. $T_{cf}$ is subtracted from $T_{cmd\_cb}$ before $T_{cmd\_cb}$ is output to the counterbalance drive.

Figure 8:
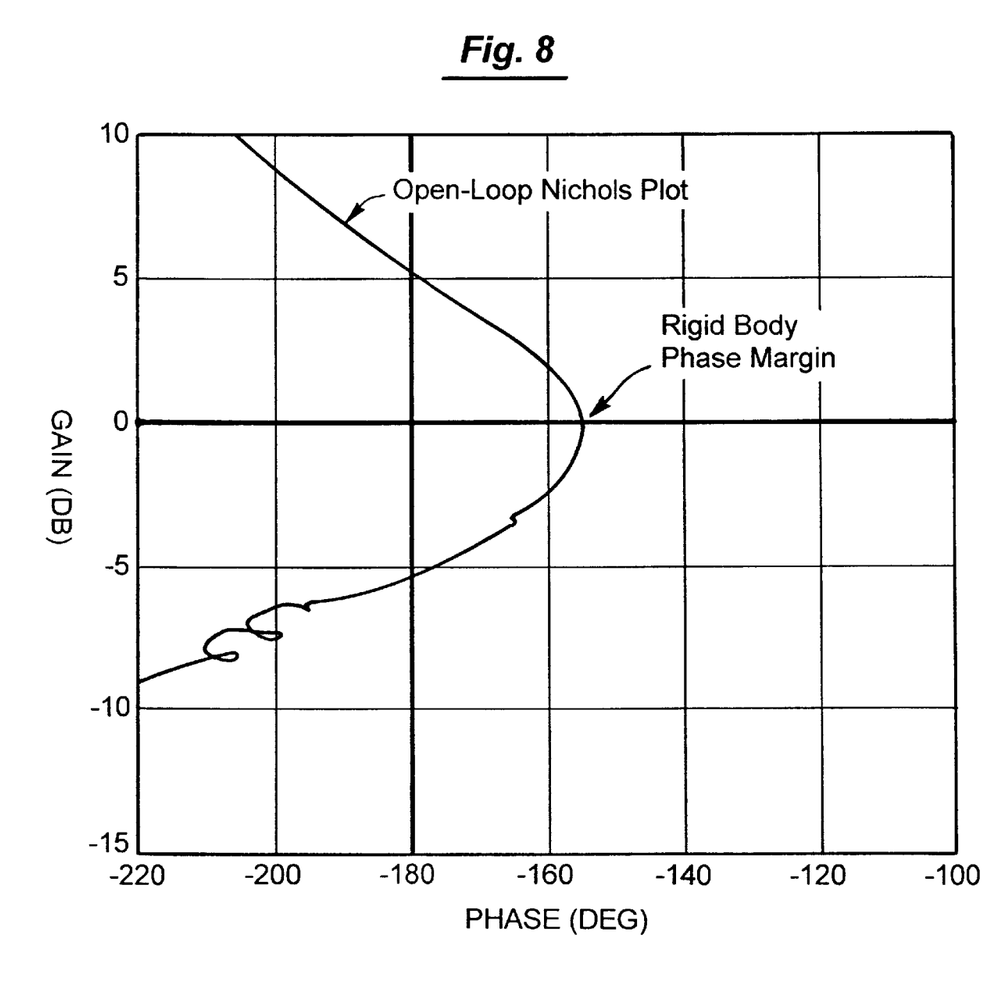
FIG. 8 is a Nichols plot of the system with the controller shown in FIG. 7.

FIG. 8 shows the Nichols plot for the torque-cross-feed-with-notch system illustrated in FIG. 7. In comparison with FIG. 6, FIG. 8 shows almost no response to the system bending modes and FIG. 8 shows that the previous stability concern no longer exists.

The discussion above describes the main mode of operation of this system, namely the scanning or oscillatory mode. The system is also required to reposition the mirror 12. The presence of the notch filter is compatible with the reposition mode of operation. When the mirror 12 and counterbalance 16 are commanded to reposition, the commanded reposition signal is not significantly affected by the notch filter because the frequency content of the reposition signal is not concentrated about the commanded resonant oscillation frequency. The reposition signal is simply a constant value or ramp that commands the mirror 12 and counterbalance 16 to move together from one angular position to another. When the mirror 12 and counterbalance 16 are commanded to reposition, the cross feed gain, $K_{cf}$, is set to zero as shown in FIGS. 5(a)–5(c) and 7.

For example, the mirror 12 and counterbalance 16 could be commanded to reposition from 0 degrees to 30 degrees. The mirror 12 and counterbalance 16 then move in unison from the initial position of 0 degrees to the final position of 30 degrees. After the final position is reached, oscillation about the 30-degree center point can be commanded. As described above, there is sufficient counterbalance error signal to keep the counterbalance oscillation centered about the 30-degree center point.

In summary, the present invention provides a scanning controller for the LIDAR mission based on the reactionless drive shown in FIG. 3. The reactionless drive provides the desired minimum energy solution to the actuation problem, but it creates challenging control problems. Control of the mirror and counterbalance system presented behaviors that required a unique solution. Excitation of system structural modes, that occurred with the high bandwidth position controllers, was an unexpected problem. Several conventional low bandwidth position controller designs were tried. However, they provide only limited isolation from the system structural modes. When the control problem was viewed as one of torque canceling rather than one of accurately controlling the counterbalance position with high bandwidth to achieve torque cancellation, the system stability problem was minimized. One controller was found to provide system mode isolation. This unique controller uses a notch filter in the counterbalance channel to remove the commanded frequency, making it insensitive to inertia differences between the mirror and the counterbalance. The resulting low bandwidth in the counterbalance channel along with cross-fed torque provides minimum excitation of system modes. A major advantage of this controller, since it stabilizes bending modes of the entire system, is that it can eliminate a possible need for modal testing of the entire assembled spacecraft or system. Thus, the cost of this type of modal testing, which can run beyond six figures, is avoided. It is believed that this design is the best controller for the reactionless drive system shown in FIG. 3.

Although the preceding discussion has focused on use of the present control system in the context of a LIDAR payload having a oscillating mirror and counterbalance, it should be understood that the present invention could be applied in many other fields of use. In particular, the present control system can be employed in any system of counter-rotating masses. For example, the present invention can be used in compressors, rotating machinery, instrumentation, radars, antennas, telescopes, scanning devices, and other types of balloon-mounted or satellite-mounted imaging systems. Therefore, the mirror 12 described above can be viewed generally as any rotating mass, and should not necessarily be limited to an optical structure.

The above disclosure sets forth a number of embodiments of the present invention. Other arrangements or embodiments, not precisely set forth, could be practiced under the teachings of the present invention and as set forth in the following claims.

We claim:

1. A system or controlling the angular position of an oscillating mass connected to a counter-oscillating counterbalance, said system comprising:
   a first drive exerting a torque on the mass in response to a first torque command signal to rotate the mass;
   a second drive exerting a torque on the counterbalance in response to a second torque command signal to rotate the counterbalance; and
   a feedback controller receiving an external command input for positioning said mass, said feedback controller having:
   (a) a first control channel generating said first torque command signal for said first drive based on the angular position of the mass and said command input; and
   (b) a second control channel generating said second torque command signal for said second drive based on said command input, the angular position of the counterbalance, and a torque cross-feed signal from said first control channel; said second control channel including a notch filter for removing frequencies from said command input to said second control channel in a predetermined bandwidth about the frequency of said first torque command signal.

2. The system of claim 1 further comprising a bending filter removing selected input frequencies from said first control channel, wherein said selected frequencies correspond to selected local bending modes of the mass, thereby preventing potential coupling with the overall system bending modes.

3. The system of claim 1 further comprising a bending filter removing selected input frequencies from said second control channel, wherein said selected frequencies correspond to selected local bending modes of the counterbalance, thereby preventing potential coupling with the overall system bending modes.

4. The system of claim 1 wherein said feedback controller further comprises means for selecting either an oscillatory mode for said mass and counterbalance, or a repositioning mode in which said mass and counterbalance are rotated in the same direction.

5. The system of claim 1 wherein the magnitude of $G_{cf}$ is approximately equal to the ratio of the inertia of the mass to the inertia of the counterbalance.

6. A system for controlling the angular position of an oscillating mass connected to a counter-oscillating counterbalance, said system comprising:

a first drive exerting a torque on the mass in response to a first torque command signal, $T_{cmd\_m}$, to rotate the mass;

a second drive exerting a torque on the counterbalance in response to a second torque command signal, $T_{cmd\_cb}$, to rotate the counterbalance;

means for measuring the angular position of the mass, $\theta_m$;

means for measuring the angular position of the counterbalance, $\theta_{cb}$;

means for subtracting $\theta_m$ from the desired angular position of the mass, $\theta_{mcmd}$, to output $\theta_{m\_err}$;

means for generating $T_{cmd\_m}$ said first drive as a predetermined proportional and differential function of $\theta_{m\_err}$;

means for multiplying $\theta_{mcmd}$ by a predetermined cross-feed gain factor, $G_{cf}$, to output $\theta_{cb\_cmd}$;

means for subtracting $\theta_{cb}$ from $\theta_{cb\_cmd}$ to output $\theta_{cb\_err}$;

a notch filter removing frequencies from $\theta_{cb\_err}$ in a predetermined bandwidth about the frequency of $\theta_{mcmd}$;

means for generating $T_{cmd\_cb}$ as a predetermined proportional and differential function of said notch filtered $\theta_{cb\_err}$;

means for multiplying $T_{cmd\_m}$ by a predetermined torque cross-feed factor, $K_{cf}$, to output $T_{cf}$; and means for subtracting $T_{cf}$ from $T_{cmd\_cb}$ to output a revised $T_{cmd\_cb}$ to said second drive.

7. The system of claim 6 further comprising a bending filter removing selected frequencies from $\theta_{m\_err}$ prior to generating $T_{cmd\_m}$, wherein said selected frequencies correspond to selected local bending modes of said mass, thereby preventing potential coupling with the overall system bending modes.

8. The system of claim 6 further comprising a bending filter removing at least one selected frequency from $\theta_{cb\_err}$ prior to generating $T_{cmd\_cb}$, wherein said selected frequencies correspond to selected local bending modes of said counterbalance, thereby preventing potential coupling with the overall system bending modes.

9. The system of claim 6 wherein said oscillating mass comprises a mirror.

10. The system of claim 6 wherein said first drive comprises a DC torque motor.

11. The system of claim 6 wherein said second drive comprises a DC torque motor.

12. The system of claim 6 wherein the magnitude of $G_{cf}$ is approximately equal to the ratio of the inertia of said mass to the inertia of said counterbalance.

13. A method for controlling the angular position of an oscillating mass connected to a counter-oscillating counterbalance, said method comprising:

measuring the angular position of the mass, $\theta_m$;

measuring the angular position of the counterbalance, $\theta_{cb}$;

subtracting $\theta_m$ from the desired angular position of the mass, $\theta_{mcmd}$, to output $\theta_{m\_err}$;

generating a first torque command signal, $T_{cmd\_m}$, as a predetermined proportional and differential function of $\theta_{m\_err}$;

multiplying $\theta_{mcmd}$ by a predetermined cross-feed gain factor, $G_{cf}$, to output $\theta_{cb\_cmd}$;

subtracting $\theta_{cb}$ from $\theta_{cb\_cmd}$ to output $\theta_{cb\_err}$;

filtering frequencies from $\theta_{cb\_err}$ in a predetermined bandwidth about the frequency of $\theta_{mcmd}$;

generating a second torque command signal, $T_{cmd\_cb}$, as a predetermined proportional and differential function of said filtered $\theta_{cb\_err}$;

multiplying $T_{cmd\_m}$ by a predetermined torque cross-feed factor, $K_{cf}$, to output $T_{cf}$;

subtracting $T_{cf}$ from $T_{cmd\_cb}$ to output a revised $T_{cmd\_cb}$;

exerting a torque on the mass determined by $T_{cmd\_m}$; and exerting a torque on the counterbalance determined by $T_{cmd\_cb}$.

14. The method of claim 13 further comprising filtering selected frequencies from $\theta_{m\_err}$ prior to generating $T_{cmd\_m}$, wherein said selected frequencies correspond to selected local bending modes of the mass.

15. The method of claim 13 further comprising filtering selected frequencies from $\theta_{cb\_err}$ prior to generating $T_{cmd\_m}$, wherein said selected frequencies correspond to selected local bending modes of the counterbalance.

16. The method of claim 13 wherein the magnitude of $G_{cf}$ is approximately equal to the ratio of the inertia of the mass to the inertia of the counterbalance.

17. A system for controlling the angular position of an oscillating mirror attached to a flexible mounting structure and connected to a counter-oscillating counterbalance by a torsion spring, said system comprising:

a mirror drive exerting a torque on the mirror in response to a mirror torque command signal, $T_{cmd\_m}$;

a counterbalance drive exerting a torque on the counterbalance in response to a counterbalance torque command signal, $T_{cmd\_cb}$;

means for measuring the angular position of the mirror, $\theta_m$;

means for measuring the angular position of the counterbalance, $\theta_{cb}$;

means for subtracting $\theta_m$ from the desired angular position of said mass, $\theta_{mcmd}$, to output $\theta_{m\_err}$;

a mirror bending filter removing predetermined frequencies from $\theta_{m\_err}$ corresponding to local bending modes of the mirror;

means for generating $T_{cmd\_m}$ said mirror drive as a predetermined proportional and differential function of said filtered $\theta_{m\_err}$;

means for multiplying $\theta_{mcmd}$ by a predetermined cross-feed gain factor, $G_{cf}$, to output $\theta_{cb\_cmd}$;

means for subtracting $\theta_{cb}$ from $\theta_{cb\_cmd}$ to output $\theta_{cb\_err}$;

a notch filter removing frequencies from $\theta_{cb\_err}$ in a predetermined bandwidth about the frequency of $\theta_{mcmd}$;

a counterbalance bending filter removing predetermined frequencies from $\theta_{cb\_err}$ corresponding to local bending modes of the counterbalance;

means for generating $T_{cmd\_cb}$ as a predetermined proportional and differential function of said filtered $\theta_{cb\_err}$;

means for multiplying $T_{cmd\_m}$ by a predetermined torque cross-feed factor, $K_{cf}$, to output $T_{cf}$; and means for subtracting $T_{cf}$ from $T_{cmd\_cb}$ to output a revised $T_{cmd\_cb}$ to said counterbalance drive.

18. The system of claim 17 wherein said mirror drive comprises a DC torque motor.

19. The system of claim 17 wherein said counterbalance drive comprises a DC torque motor.

20. The system of claim 17 wherein the magnitude of $G_{cf}$ is approximately equal to the ratio of the inertia of the mirror to the inertia of the counterbalance.

* * * * *